United States Patent
Ohkita et al.

(10) Patent No.: US 6,911,507 B2
(45) Date of Patent: Jun. 28, 2005

(54) PROCESSES FOR PRODUCING CYCLOOLEFIN ADDITION POLYMER

(75) Inventors: Kenzo Ohkita, Tokyo (JP); Noboru Oshima, Tokyo (JP); Takashi Imamura, Tokyo (JP); Takashi Tsubouchi, Tokyo (JP)

(73) Assignee: JSR Corporation, Tokyo (JP)

( * ) Notice: Subject to any disclaimer, the term of this patent is extended or adjusted under 35 U.S.C. 154(b) by 84 days.

(21) Appl. No.: 10/466,429
(22) PCT Filed: Jan. 23, 2001
(86) PCT No.: PCT/JP02/00453
§ 371 (c)(1),
(2), (4) Date: Jul. 16, 2003
(87) PCT Pub. No.: WO02/059168
PCT Pub. Date: Aug. 1, 2002

(65) Prior Publication Data
US 2004/0063873 A1 Apr. 1, 2004

(30) Foreign Application Priority Data
Jan. 24, 2001 (JP) .................................. 2001-015318
Jul. 27, 2001 (JP) .................................. 2001-227248
Jul. 27, 2001 (JP) .................................. 2001-227249

(51) Int. Cl.$^7$ ................................................. C08F 4/70
(52) U.S. Cl. .................... 526/169.1; 526/115; 526/122; 526/133; 526/137; 526/140; 526/143; 526/157; 526/161; 526/279; 526/281; 526/308; 526/903
(58) Field of Search .............................. 526/169.1, 281, 526/115, 122, 133, 137, 140, 143, 157, 161, 279, 308, 903

(56) References Cited

U.S. PATENT DOCUMENTS 5,468,819 A * 11/1995 Goodall et al. .............. 526/171
5,705,503 A * 1/1998 Goodall et al. .............. 526/281
6,350,832 B1 2/2002 Bell et al.

FOREIGN PATENT DOCUMENTS

| JP | 2000-351885 | 12/2000 |
| JP | 2001-19723 | 1/2001 |
| WO | 95/14048 | 5/1995 |
| WO | 97/33198 | 9/1997 |

OTHER PUBLICATIONS

U.S. Appl. No. 10/515,189, filed Nov. 29, 2004, Oshima et al.
U.S. Appl. No. 10/466,429, filed Jul. 16, 2003, Ohkita et al.
U.S. Appl. No. 10/969,065, filed Oct. 21, 2004, Oshima et al.
U.S. Appl. No. 10/466,429, filed Jul. 16, 2003, Ohkita et al.

* cited by examiner

*Primary Examiner*—Fred Teskin
(74) *Attorney, Agent, or Firm*—Oblon, Spivak, McClelland, Maier & Neustadt, P.C.

(57) ABSTRACT

A cyclic olefin having a specific polar group is polymerized by addition polymerization in a hydrocarbon solvent, using a polymerization catalyst component containing (i) a specific transition metal compound, (ii) a Lewis acid compound and (iii) an alkyl aluminoxane, or the cyclic olefin is polymerized by addition polymerization in the hydrocarbon solvent, using the polymerization catalyst component, by further adding at least one aromatic vinyl compound and at least one cyclic nonconjugated polyene compound, or either one of them as a molecular weight modifier, thereby obtaining a cyclic olefinic addition polymer.

13 Claims, No Drawings

PROCESSES FOR PRODUCING CYCLOOLEFIN ADDITION POLYMER

TECHNICAL FIELD

The present invention relates to a method for producing a cyclic olefinic addition polymer. More particularly, the present invention is characterized in that a monomer component containing at least one cyclic olefin having a polar group is polymerized by addition polymerization in a hydrocarbon solvent, using a specific catalyst without a necessity for a large amount of an alkyl aluminoxane. Further, the present invention relates to a method for producing a cyclic olefinic addition polymer having an aromatic vinyl group at a polymer terminal. Still further, the present invention relates to a method for producing a cyclic olefinic addition polymer controlled in molecular weight and molecular weight distribution. Yet still further, the present invention relates to a method for improving polymerization activity in the production of a cyclic olefinic addition polymer.

BACKGROUND ART

In recent years, as resinification in the optical material and electronic material fields proceeds, accompanied by a demand for a decrease in size and weight, and increase in density of electronic instruments, resins excellent in heat resistance, mechanical strength, moisture absorption resistance, dimensional stability, solvent resistance and the like, as well as optical transparency, have been desired. For example, in liquid crystal display devices in which glass substrates have hitherto been used, plastic substrates have recently been used for weight saving and a reduction in breakage in dropping. However, materials used are required to have extremely high heat resistance, in respect to their production process.

As plastic materials having high transparency, heat resistance and the like as described above, cyclic olefin polymers have been proposed. As the cyclic olefin polymers, there have hitherto been proposed hydrogenated ring-opening polymers (Japanese Patent Laid-open Publication (Sho) 60-26024, Japanese Patent No. 3050196, Japanese Patent Laid-open Publication (Hei) 1-132625, Japanese Patent Laid-open Publication (Hei) 1-132625, etc.), addition copolymers of cyclic olefins and ethylene [Japanese Patent Laid-open Publication (Sho) 61-292601, Makromol. Chem. Macromol. Symp. Vol. 47, 83 (1991), etc.], addition copolymers of cyclic olefins (Japanese Patent Laid-open Publication (Hei) 4-63807, Japanese Patent Laid-open Publication (Hei) 8-198919, Published Japanese Translation of PCT Application (Hei) 9-508649, Published Japanese Translation of PCT Application (Hei) 11-505880, etc.) and the like.

Of these, the hydrogenated ring-opening polymers are not necessarily satisfactory in respect to heat resistance, because it is difficult to achieve a glass transition temperature of 200° C. or higher. Further, double bonds not hydrogenated often remain in trace amounts in molecular chains, which causes the problems of coloring at high temperatures and the like in some cases.

Many addition copolymers of cyclic olefins, obtained by metallocene catalysts using zirconium, titanium and the like are reported. It is also reported that insoluble, infusible cyclic olefinic addition polymers are obtained by the metallocene catalysts. However, the metallocene catalysts exhibit only extremely low polymerization activity on polar group-containing monomers, so that the introduction of polar groups is difficult. Further, in order to obtain high polymerization activity, catalyst components demand complicated structures, and multistep synthesis are required. Moreover, large amounts of aluminoxane are necessary as a cocatalyst. Accordingly, cost associated with the catalysts rises, and complicated processes have been required for removal of the catalysts.

In contrast, addition polymers of cyclic olefins polymerized using late transition metal compound components such as nickel and palladium can exhibit glass transition temperatures exceeding 200° C., and suitably used for applications requiring extremely high heat resistance. Further, it is possible to control the glass transition temperature or to impart functions by selection of monomer components.

As a problem in the addition polymerization of cyclic olefins, it is mentioned that polar substituents act as poisons to transition metal catalyst components to significantly decrease polymerization activity. A problem is therefore encountered with regard to the introduction of the polar groups into the addition polymers.

Japanese Patent Laid-open Publication (Hei) 4-63807 discloses a method for producing a norbornene-based polymer using a catalyst containing a transition metal compound and an aluminoxane as main components. In this specification, not only a hydrocarbon group, but also an oxygen atom- or nitrogen atom-containing group is specified as a substituent for a norbornene-based monomer. However, such a monomer is not used in examples, so that there is no description that a polymer containing a cyclic olefin having a polar group as a structural unit is obtained by the method of this specification. Further, it is apparent from the examples described in this specification that the method of this specification requires the aluminoxane component in large amounts.

Japanese Patent Laid-open Publication (Hei) 8-198919 proposes an addition type copolymer of norbornene and substituted norbornene. However, the substituent is limited to a hydrocarbon group, and a polymer containing a substituted norbornene having a polar group as a structural unit is not described at all.

On the other hand, many investigations have hitherto been conducted with respect to polymerization of cyclic olefins having a polar group. For example, W. Risse et al. [Makromol. Chem. 193, 2915 (1992), Macromolecules 29, 2755 (1996), etc.] and M. Novak et al. [Macromolecules 28, 5396 (1995), etc.] has proposed several palladium compounds. Further, Published Japanese Translation of PCT Application (Hei) 11-505880 also discloses a polymerization method of a functional group-containing norbornene type monomer using a palladium compound component.

However, the palladium catalyst systems mentioned above require multistep synthetic pathways or combinations of expensive reagents such as silver compounds in many cases, resulting in extremely increased cost with respect to the catalysts. Further, a halogenated hydrocarbon such as dichloromethane or chlorobenzene, nitromethane, tetramethylurea and the like are used as solvents, because the solubility of the catalyst components in hydrocarbon solvents is low and the polymerization activity is low. However, these solvents are expensive, or adverse effects on the human body or the environment are feared. Accordingly, they are not industrially actual solvents.

In contrast, according to PCT International Application Patents WO 97/33198 and WO 99/14635, a cyclic olefin having a polar group such as an ester group can be polymerized by a single-component catalyst system comprising a bis(perfluorophenyl)nickel complex. The nickel compounds used in these specifications also require multiple steps for synthesis, and catalyst cost rises.

That is to say, it has hitherto been desired to obtain an addition polymer containing a structural unit derived from a cyclic olefin having a polar group, using a catalyst high in availability and low in cost, without using a large amount of an aluminoxane cocatalyst. However, conventional techniques have been insufficient.

As another problem in the addition polymerization of the cyclic olefin, chain transfer dosen't occur easily and the controlled molecular weight of the addition polymer is difficult to obtain. For example, when the molecular weight of the cyclic olefin-based addition polymer is too high, difficulty in forming or damaged suraface smoothness is caused by the handling difficulty from the increased solution viscosity, insolubility in a practical solvent or a gel-like by-product component. On the other hand, in the case of the addition polymer having a low molecular weight, a formed film becomes brittle, and further, solvent resistance and liquid crystal resistance are reduced.

To control the molecular weight of the addition polymer, control of the amount of a polymerization catalyst and the addition of a molecular weight modifier has been utilized. Of these, the method by the control of the amount of the catalyst is not practical, because a large amount of the catalyst is required depending on the target molecular weight, resulting in increased cost, and great cost is necessary for reducing residual metal components to a degree required for an optical or electron material application. Further, a large amount of the catalyst makes it difficult to control the polymerization temperature.

A method is disclosed in which an α-olefin is used as a chain transfer agent for controlling the molecular weight of a norbornene functional addition polymer, in a system in which a group VIII transition metal compound is used as a polymerization catalyst (Published Japanese Translation of PCT Application (Hei) 9-508649). In this method, it is presumed that chain transfer occurs by insertion of the α-olefin and the subsequent β-hydrogen elimination mechanism, and an olefinic unsaturated bond is formed in a terminal group moiety of the norbornene-functional olefinic addition polymer. However, in this specification, the chain transfer agents available are limited, and an aromatic vinyl compound such as styrene is apparently excluded. It is therefore unable to selectively introduce an aromatic substituent into a molecular chain terminal of the polymer by this technique.

Further, Published Japanese Translation of PCT Application (Hei) 11-505877 discloses copolymerization of a norbornene type monomer and a cationically polymerizable monomer by a catalyst containing a transition metal of the group VIII. In this specification, however, an aromatic vinyl compound is excluded from both the cationically polymerizable monomer and the chain transfer agent.

On the other hand, it is reported that an aromatic vinyl compound is copolymerized with a cyclic olefin by a specific polymerization catalyst. For example, Japanese Patent Laid-open Publication (Hei) 1-311109 discloses a process for producing a copolymer of a norbornene-based monomer and styrenic monomer, using a catalyst formed of hydrocarbon—soluble vanadium and organic aluminum. Further, Japanese Patent Laid-open Publication (Hei) 4-45113 discloses a method for producing a copolymer, using a catalyst containing a nickel compound and an aluminoxane as main components. That is to say, in any of the specifications, the styrenic monomer is one of units constituting the polymer, and introduced into a molecular chain of the polymer. As a method for controlling the molecular weight, the use of hydrogen is suggested. However, it is neither described nor suggested that an aromatic vinyl compound is used for the control of the molecular weight.

Further, in Japanese Patent Laid-open Publication (Hei) 4-45113 described above, not only a hydrocarbon group, but also an oxygen atom-containing group or a nitrogen atom-containing group is specified as a substituent—for a norbornene-based monomer. However, such a monomer is not used in examples. There is therefore no description that a copolymer containing a norbornene structural unit having a polar group is obtained by the method of this specification. Furthermore, the substituent specified on the styrenic monomer in this specification is limited to a hydrocarbon group and a halogen atom, and a method for introducing aromatic group having a polar group into a polymer is not described.

Japanese Patent Laid-open Publication 2001-19723 discloses a method for producing a copolymer of a cyclic olefin and styrene into which an ionic dissociation group is introduced. However, the method of this specification comprises the step of previously producing a copolymer of the cyclic olefin and styrene and the step of introducing the ionic dissociation group such as a sulfonic acid group into the copolymer, so that polar groups that can be introduced into an aromatic substituent are limited to some of them. Further, also in this specification, styrene is regarded as a monomer. It is therefore unable to control the molecular weight with a polymerization catalyst used in examples, and it is also unable to selectively introduce an aromatic substituent into a terminal of a molecular chain.

As apparent from the above, it has been unable to control the addition polymer of the cyclic olefin to an arbitral molecular weight, and to selectively introduce the aromatic substituent into the molecular chain terminal by the conventional techniques. Similarly, it has also been unable to introduce the polar group-containing aromatic substituent into the molecular chain terminal of the cyclic olefinic addition polymer.

Further, in any of the specifications mentioned above, a cyclic nonconjugated diene as a mean for molecular weight control and activity enhancement is neither described nor suggested. Furthermore, a technique for controlling the molecular weight distribution of the cyclic olefinic addition polymerization has not hitherto been reported, including the above-mentioned specifications.

DISCLOSURE OF THE INVENTION

The present invention has been made in view of the above-mentioned problems, and an object of the invention is to provide a method for producing a cyclic olefinic addition polymer, which comprises polymerizing a monomer component containing a cyclic olefin having a polar group by addition polymerization in a hydrocarbon solvent, using an easily available catalyst component, and without using a large amount of an aluminoxane. Another object of the present invention is to provide a cyclic olefinic addition polymer having an aromatic substituent group at a terminal thereof. Still another object of the present invention is to provide a cyclic olefinic addition polymer whose molecular weight and molecular weight distribution are controlled. A further object of the present invention is to provide a technique for enhancing polymerization activity in the production of a cyclic olefinic addition polymer.

According to the present invention, there is provided a method for producing a cyclic olefinic addition polymer, which is characterized in that a cyclic olefin containing a substituted norbornene having a specific polar group is addition-polymerized in a hydrocarbon solvent, using a polymerization catalyst component containing (i) a specific compound of a groups 8 to 10 transition metal in the periodic table, (ii) a Lewis acid compound and (iii) an alkyl aluminoxane. Further, according to the present invention, there is provided a method for producing a cyclic olefinic addition polymer, which comprises further adding at least one aromatic vinyl compound and at least one cyclic nonconjugated polyene compound, or either one of them as a molecular weight modifier in polymerizing a cyclic olefin by addition polymerization in a hydrocarbon solvent, using a polymerization catalyst component containing (i) a specific compound of a groups 8 to 10 transition metal in the periodic table, (ii) a Lewis acid compound and (iii) an alkyl aluminoxane.

BEST MODE FOR CARRYING OUT THE INVENTION

When polymerization is conducted using the catalyst component described in the present invention, the cyclic olefin containing a substituted norbornene having a polar group can be polymerized by addition polymerization. In Japanese Patent Laid-open Publication (Hei) 4-63807 described above, when the catalyst containing the nickel compound and the alkyl aluminoxane is used as shown in the example, it has been revealed that the catalyst exhibits no or markedly reduced polymerization activity, if a substituted norbornene having a polar group such as an ester group or an alkoxysilyl group exists even slightly in the polymerization system. Moreover, in the method described in the examples of this specification, it is necessary that the alkyl aluminoxane is added in an amount exceeding 100 times as much as the nickel atom, in terms of the aluminum atom.

However, surprisingly, it has been confirmed that not only the polymerization proceeds while keeping practical activity even when the polar group-containing cyclic olefin exists in the polymerization system, but also sufficient activity is expressed by only the use of the alkyl aluminoxane about 10 times as much as the transition metal atom, in terms of the aluminum atom, by conducting the polymerization using the catalyst component described in the present invention. As a result of further detailed investigation, it has been possible to control the molecular weight distribution of the addition polymer by the control of the amount of the alkyl aluminoxane used.

As a result of further intensive investigation, it has become clear that the molecular weight of the addition polymer measured by gel permeation chromatography can be arbitrarily controlled, and that the aromatic substituent group can be introduced into the molecular chain terminal, by adding the aromatic vinyl compound to the polymerization system in polymerizing the cyclic olefin by addition polymerization in the hydrocarbon solvent, using the catalyst component described in the present invention. Although the mechanism thereof is not described herein in detail, it is considered to be due to insertion of the aromatic vinyl compound and the subsequent β-hydrogen elimination. According to this mechanism, the aromatic substituent group is introduced into the molecular chain terminal, and an olefinic double bond is formed. For example, when norbornene is used as a monomer and the molecular weight is controlled with styrene, it is confirmed by observation of weak absorption in the vicinity of 700 $cm^{-1}$ in an infrared absorption spectrum that the aromatic substituent group is attached to the addition polymer. It is interesting to note that absorption assigned to the aromatic vinyl compound has only been observed at an intensity corresponding to the consideration that only one unit per molecule of the addition polymer is introduced, in a nuclear magnetic resonance spectrum (NMR) of the addition polymer. That is to say, the aromatic vinyl compound introduced into the molecular chain does not exist, or is negligible. It is therefore reasonable to consider that the compound has been selectively introduced into the molecular chain terminal.

Further, according to the method of the present invention, an aromatic vinyl compound having a polar group such as an alkoxysilyl group can also be used as a molecular weight modifier. For example, as a result of investigation by the present inventors, the catalyst exemplified in the examples of Japanese Patent Laid-open Publication (Hei) 4-45113 described above, which contains the nickel compound and the aluminoxane as main components, has shown no or markedly reduced polymerization activity. On the contrary, according to the present invention, it has been revealed that the addition polymerization proceeds while keeping practical activity.

The present inventors have elucidated that the cyclic olefinic addition polymer narrower in molecular weight distribution can be obtained at any molecular weight by adding the cyclic nonconjugated polyene to the polymerization system, in polymerizing the cyclic olefin by addition polymerization, using the catalyst component described in the present invention, and further, that polymerization activity can be improved.

Conventionally, as an application of the cyclic nonconjugated polyene, ligands thermally stabilizing transition metal compounds have been known. For example, many transition metal-cyclooctadiene complexes and the like are isolated. However, there is no report at all indicating that the cyclic olefinic addition polymer narrow in molecular weight distribution is obtained, the control of the molecular weight is possible, and further, polymerization activity is improved, by adding the cyclic nonconjugated polyene compound at a specific ratio and conducting polymerization. In Published Japanese Translation of PCT Application (Hei) 9-508649 described above, it is described that an cycloaliphatic diolefin can be added to a specific catalyst system as an electron donor of any third component of a catalyst. However, a description with respect to the objects of the present invention is not found at all, and effects thereof are also unclear.

As a result of investigation by the present inventors, it has become clear that the cyclic olefinic addition polymer narrower in molecular weight distribution can be obtained at any molecular weight by adding the cyclic nonconjugated polyene to the polymerization system at a specific ratio based on (i) the above-mentioned specific compound of the groups 8 to 10 transition metal in the periodic table.

It should be further noted that the result of clearly improving the polymerization activity has been obtained by adding the cyclic nonconjugated polyene to the polymerization system at a specific ratio based on (i) the above-mentioned specific transition metal compound. The effect of the cyclic nonconjugated polyene in the present invention is said to be specific, compared to that the α-olefin used in the prior art as the molecular weight modifier has neither the effect of improving polymerization activity nor the effect of forming a polymer narrower in molecular weight distribution.

In the present invention, as the polymerization catalyst, there can be used (i) the transition metal compound represented by the following formula:

$$[L_1MX][An] \quad (1)$$

wherein M is a groups 8 to 10 transition metal in the periodic table, L is a neutral ligand or a solvent molecule, for example, an aromatic hydrocarbon such as benzene, toluene, xylene or mesitylene, a cyclic polyene such as 1,5-cyclooctadiene or norbornadiene, or an ether compound such as diethyl ether, dibutyl ether or tetrahydrofuran, 1 is from 0 to 3, X is a β-diketonate anion or a carboxylic acid anion having a linear or branched alkyl group having 1 to 12 carbon atoms, and An is a non-coordinate or weakly coordinate anion, in which one selected from $SbF_6^-$, $PF_6^-$, $BF_4^-$, $CF_3SO_3^-$ and $CF_3COO^-$ is preferably used. The transition metal compound of formula (1) may be synthesized, appropriately using known methods, isolated one may be used, or the compound may be used without previous isolation.

Further, (i) the transition metal compound represented by formula (1) can also be obtained by modifying a compound selected from a β-diketonate compound of a groups 8 to 10 transition metal in the periodic table and a carboxylic acid salt of a groups 8 to 10 transition metal in the periodic table, the carboxylic acid having a linear or branched alkyl group having 1 to 12 carbon atoms, with a strong Bronsted acid compound. As a result of this modification operation, it is considered that one of β-diketonate anions or carboxylic acid anions coordinated to a transition metal atom bond to a hydrogen ion supplied from the strong Bronsted acid compound to leave, thereby forming the above-mentioned transition metal compound (1). As a method of modification, a method is employed in which the β-diketonate compound or carboxylic acid salt of the groups 8 to 10 transition metal in the periodic table is mixed and reacted with the strong Bronsted acid compound in a hydrocarbon solvent at a temperature of 30° C. or less. In that case, the uniformity of reaction and the stability of the product can be enhanced by allowing the neutral ligand or the coordinate solvent represented by L described above to exist. A compound in which all anions are substituted by the strong Bronsted acid anions, which is formed as a by-product when the strong Bronsted acid compound is added in excess, is usually insoluble in the hydrocarbon solvent, so that it can be removed by a method such as filtration.

Specific examples of the β-diketonate compounds of the transition metals belonging to groups 8 to 10 in the periodic table include nickel bis(acetylacetonate), nickel bis (ethylacetoacetate), cobalt bis(acetylacetonate), palladium bis(acetylacetonate) and the like. Further, specific examples of the carboxylic acid salts include nickel acetate, nickel propionate, nickel 2-ethylhexanoate (nickel octylate), nickel 3,5,5-trimethylhexanoate (nickel isononanoate), nickel octanoate, nickel naphthenate, nickel neodecanoate, nickel cyclohexylcarboxylate, nickel laurate and nickel stearate. Particularly desirably, nickel bisacetylacetonate, nickel 2-ethylhexanoate, nickel 3,5,5-trimethylhexanoate, nickel octanoate, nickel naphthenate, nickel neodecanoate, nickel cyclohexylcarboxylate, nickel laurate, nickel stearate, cobalt acetate, cobalt propionate, cobalt 2-ethylhexanoate, cobalt naphthenate, cobalt neodecanoate, cobalt laurate, cobalt stearate, palladium acetate, palladium propionate, palladium 2-ethylhexanoate, palladium naphthenate and palladium neodecanoate are used. Of these, the compounds of nickel or cobalt are desirably used, and the compounds of nickel are more desirably used.

As the strong Bronsted acid compound used in the present invention, one selected from hexafluoroantimonic acid, hexafluorophosphoric acid, tetrafluoroboric acid, trifluoromethanesulfonic acid and trifluoroacetic acid is desirably used.

They can be used either alone or as a combination of two or more of them, and are used at a molar ratio ranging from 0.5 to 10 times, desirably from 1 to 2 times as much as the transition metal atom. When they are added in large amounts exceeding this range, (i) the transition metal compound components are decomposed, or insoluble components are formed in large amounts, resulting in unsuitability for polymerization use.

Further, in conducting addition polymerization by the method of the present invention, (ii) the Lewis acid compound is used in combination with (i) the above-mentioned transition metal compound, and the effect thereof is outstanding in using a cyclic olefin having a polar substituent group such as an ester group or an acid anhydride, or styrene having a polar group. In particular, in the copolymerization of the cyclic olefin having the acid anhydride as the substituent group, not only polymerization activity is extremely lowered, but also the acid anhydride is scarcely introduced into the resulting addition polymer, in the absence of the Lewis acid compound. In contrast, it has become clear that the copolymerization proceeds while keeping good activity, by adding the Lewis acid compound. As the Lewis acid compound, there is desirably used one selected from boron trifluoride, aluminum trifluoride, titanium tetrachloride, antimony pentafluoride, tris(pentafluorophenyl)boron and tris(3,5-bistrifluoromethylphenyl)boron. Boron trifluoride, aluminum trifluoride, titanium tetrachloride and antimony pentafluoride are particularly desirably used. They can be used either alone or as a combination of two or more of them, and are used at a molar ratio ranging from 1 to 10 times as much as the transition metal atom constituting (i) the transition metal composition.

(iii) The alkyl aluminoxane used in combination with (i) the above-mentioned transition metal compound comprises a unit represented by the following formula:

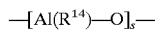

The chemical structure thereof is not necessarily clear, but is presumed to be a linear, cyclic or cluster-like compound, or a mixture of these compounds. Here, $R^{14}$ is an alkyl group having 1 to 20 carbon atoms, preferably a methyl group, an ethyl group or an isobutyl group, and particularly preferably a methyl group; and s is an integer of 2 or more, and preferably an integer ranging from 5 to 60.

Further, modified methyl aluminoxane (hereinafter referred to as "MMAO") in which the solubility and storage stability of methyl aluminoxane are improved by adding a trialkylaluminum or the like can also be used. The alkyl aluminoxane compound can be produced by known methods through reaction of an alkylaluminum compound having at least one of the above-mentioned $R^{14}$ group with water, and can also be formed by bringing the alkylaluminum compound into contact with a trace amount of water in a reaction vessel in polymerization.

(iii) The alkyl aluminoxane is used at a ratio ranging preferably from 1 to 100 times, most preferably from 1 to 50 as much as the transition metal atom constituting (i) the transition metal composition. In that case, the molecular weight distribution of the resulting addition polymer can be widened by lowering this ratio, whereas the addition polymer narrower in distribution can be obtained by heightened the ratio. The use in an amount exceeding the above-mentioned range is meaningless, or reduces activity of addition polymerization in some cases.

The aromatic vinyl compounds that can be used as the molecular weight modifiers in the methods shown in the present invention include, for example, styrene and substituted styrenes, α-methylstyrenes 1-vinylstyrenes and the like. Desirably, styrene and substituted styrenes are used, and specific examples of the substituted styrenes include 2-methylstyrene, 2-ethylstyrene, 2-isopropylstyrene, 2-t-butylstyrene, 2-hexylstyrene, 2,3-dimethylstyrene, 2,3-diethylstyrene, 2,4,6-trimethylstyrene, 2-phenylstyrene, 2-chlorostyrene, 2-bromostyrene, 2-fluorostyrene, 2-trimethoxysilylstyrene, 2-triethoxysilylstyrene, 2-dimethoxymethylsilylstyrene, 2-vinylanisole, 2-methoxymethylstyrene, 2-(2-methoxyethyl)styrene, 1,4-divinylbenzene and geometrical isomers thereof.

They can be used either alone or as a combination of two or more of them.

Another functional group may be further introduced by a known method into the aromatic substituent and the olefinic double bond introduced into the molecular chain terminal by the method of the present. The aromatic substituent and the olefinic double bond may also be converted into another functional group. For example, alkylation, halogenation, sulfonation, acylation and hydrogenation of the aromatic substituent group, epoxidation, hydrosilylation, hydroboration, hydroformylation, dihydroxylation, addition of maleic anhydride and grafting of the olefinic double bond, and the like can be conducted.

The amount of the aromatic vinyl compound added is 0.1% or more, and desirably from 0.1% to 10%, by molar ratio, based on the total amount of the cyclic olefin. In the case of less than 0.01%, the effect of addition of the aromatic vinyl compound is extremely decreased.

In the present invention, the cyclic nonconjugated polyene that can be used as the molecular weight modifier is desirably represented by the following formula (5):

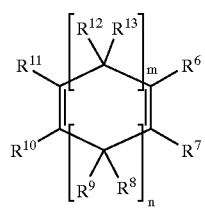

(5)

[in formula (5), R6 to R13, which are the same or different, each represents a hydrogen atom, a halogen atom, a hydrocarbon group having 1 to 10 carbon atoms, a halogenated hydrocarbon group, an organo-silicon group or a halogenated silicon group, and m and n are an integer of 1 to 3.]

Specific examples thereof include unsubstituted or substituted cyclohexadienes such as 1,4-cyclohexadiene, 1-methyl-1,4-cyclohexadiene, 3-methyl-1,4-cyclohexadiene, 1,2-dimethyl-1,4-cyclohexadiene, 1,4-dimethyl-1,4-cyclohexadiene, 1,2,4,5-tetramethyl-1,4-cyclohexadiene and 1-isopropyl-4-methylcyclohexa-1,4-diene (γ-terpinene), unsubstituted or substituted cycloheptadienes such as 1,4-cycloheptadiene, unsubstituted or substituted cyclooctadienes such as 1,4-cyclooctadiene, 1,5-cyclooctadiene, 1-methyl-1,5-cyclooctadiene and 1,5-dimethyl-1,5-cyclooctadiene, and the like. More desirable are unsubstituted or substituted cyclohexadienes. They can be used either alone or as a combination of two or more of them.

The amount of the cyclic nonconjugated polyene used ranges in molar ratio from 0.01 to 500 times, desirably from 0.1 to 100 times, and more desirably from 0.2 to 50 times as much as the transition metal atom constituting (i) the transition metal composition. In the case of less than 0.01 time, the effect of the cyclic nonconjugated polyene is not obtained. On the other hand, in the case of more than 500 times, practical catalytic activity is not obtained.

In the method of the present invention, the aromatic vinyl compound and the cyclic nonconjugated polyene can be used at the same time as the molecular weight modifiers, or only either one can also be used.

The cyclic olefinic addition polymer obtained by the method of the present invention comprises cyclic olefin-derived structural units. The cyclic olefins include norbornene and substituted norbornenes, and specific examples thereof include a substituted norbornene having polar group represented by the following formula (2):

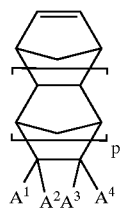

(2)

[in formula (2), at least one of $A^1$, $A^2$, $A^3$ and $A^4$ is a polar group represented by $-(CR^1R^2)_qZ$, and the others, which are the same or different, each represents a hydrogen atom, a halogen atom, an alkyl group having 1 to 10 carbon atoms, an haloalkyl group, an aralkyl group, a cycloalkyl group or an aryl group, wherein Z represents $-C(O)R^3$, $-OC(O)R^4$, $-C(O)OR^5$ or $-SiY^1Y^2Y^3$, $R^1$ to $R^5$, which are the same or different, each represents a hydrogen atom, a hydrocarbon group having 1 to 10 carbon atoms or a halogenated hydrocarbon group; $Y^1$ to $Y^3$ are the same or different, at least one is a halogen atom, an alkoxyl group, an allyloxy group or a siloxy group, and the others each represents a hydrogen atom, a hydrocarbon group having 1 to 10 carbon atoms or a halogenated hydrocarbon group; $A^1$ and $A^2$, or $A^1$ and $A^3$ may be cyclized to form a lactone or an acid anhydride; and p and q each represent an integer of 0 to 3.]

Specific examples of the substituted norbornenes having polar group represented by the above-mentioned formula (2) include 5-trimethoxysilyl-2-norbornene, 5-chlorodimethoxysilyl-2-norbornene, 5-dichloromethoxysilyl-2-norbornene, 5-chloromethoxymethylsilyl-2-norbornene, 5-methoxymethylhydrosilyl-2-norbornene, 5-dimethoxyhydrosilyl-2-norbornene, 5-methoxydimethylsilyl-2-norbornene, 5-triethoxysilyl-2-norbornene, 5-chlorodiethoxysilyl-2-norbornene, 5-dichloroethoxysilyl-2-norbornene, 5-chloroethoxymethylsilyl-2-norbornene, 5-diethoxyhydrosilyl-2-norbornene, 5-ethoxydimethylsilyl-2-norbornene, 5-ethoxydiethylsilyl-2-norbornene, 5-tripropoxysilyl-2-norbornene, 5-triisopropoxysilyl-2-norbornene, 5-triphenoxysilyl-2-norbornene, 5-diphenoxymethylsilyl-2-norbornene, 5-trifluorosilyl-2-norbornene, 5-trichlorosilyl-2-norbornene, 5-tribromosilyl-2-norbornene, 5-trimethoxysilylmethyl-2-norbornene, 5-(1-trimethoxysilylethyl)-2-norbornene, 5-(2-trimethoxysilylethyl)-2-norbornene, 5-(1-chlorodimethoxysilylethyl)-2-norbornene, 5-(2-chlorodimethoxysilylethyl)-2-norbornene, 5-triethoxysilylmethyl-2-norbornene, 5-(1-triethoxysilylethyl)-2-norbornene, 5-(2-triethoxysilylethyl)-2-norbornene, 5-(1-chlorodiethoxysilylethyl)-2-norbornene, 5-(2-chlorodiethoxysilylethyl)-2-norbornene, 5-(2-trimethoxysilylpropyl)-2-norbornene, 5-(3-trimethoxysilylpropyl)-2-norbornene, 5-(2- triethoxysilylpropyl)-2-norbornene, 5-(3-triethoxysilylpropyl)-2-norbornene, trimethoxysilylpropyl 5-norbornene-2-carboxylate, triethoxysilylpropyl 5-norbornene-2-carboxylate, dimethoxymethylsilylpropyl 5-norbornene-2-carboxylate, trimethoxysilylpropyl 2-methyl-5-norbornene-2-carboxylate, dimethoxymethylsilylpropyl 2-methyl-5-norbornene-2-carboxylate, triethoxysilylpropyl 2-methyl-5-norbornene-2-carboxylate, 2-acetyl-5-norbornene, methyl 5-norbornene-2-carboxylate, ethyl 5-norbornene-2-carboxylate, t-butyl 5-norbornene-2-carboxylate, methyl 2-methyl-5-norbornene-2-carboxylate, ethyl 2-methyl-5-norbornene-2-carboxylate, t-butyl 2-methyl-5-norbornene-2-carboxylate, trifluoromethyl 2-methyl-5-norbornene-2-carboxylate, 5-norbornene-2-yl acetate, 2-methyl-5-norbornene-2-yl acetate, 2-methyl-5-norbornene-2-yl acrylate, 2-methyl-5-norbornene-2-yl methacrylate, dimethyl 5-norbornene-2,3-dicarboxylate, diethyl 5-norbornene-2,3-dicarboxylate, 5-norbornene-2,3-dicarboxylic acid anhydride, methyl 8-methyl-3-tetracyclo[4.4.0.1$^{2,5}$.1$^{7,10}$]dodecene-8-carboxylate, spiro ring compounds as shown below, and the like.

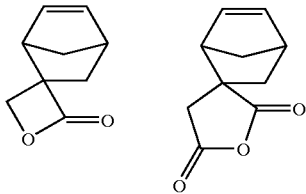

As the substituted norbornene having polar group, a norbornene having silyl group as represented by the following formula (3) is suitably used.

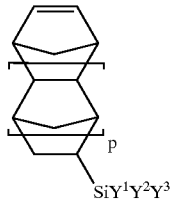

(3)

[in formula (3), $Y^1$ to $Y^3$ are the same or different, at least one is a halogen atom, an alkoxyl group, an allyloxy group or a siloxy group, and the others each represents a hydrogen atom, a hydrocarbon group having 1 to 10 carbon atoms or a halogenated hydrocarbon group; and p represents an integer of 0 to 3.]

Specific examples of the substituted norbornenes having polar group represented by the above-mentioned formula (3) include 5-trimethoxysilyl-2-norbornene, 5-chlorodimethoxysilyl-2-norbornene, 5-dichloromethoxysilyl-2-norbornene, 5-chloromethoxymethylsilyl-2-norbornene, 5-methoxymethylhydrosilyl-2-norbornene, 5-dimethoxyhydrosilyl-2-norbornene, 5-methoxydimethylsilyl-2-norbornene, 5-triethoxysilyl-2-norbornene, 5-chlorodiethoxysilyl-2-norbornene, 5-dichloroethoxysilyl-2-norbornene, 5-chloroethoxymethylsilyl-2-norbornene, 5-diethoxyhydrosilyl-2-norbornene, 5-ethoxydimethylsilyl-2-norbornene, 5-ethoxydiethylsilyl-2-norbornene, 5-tripropoxysilyl-2-norbornene, 5-triisopropoxysilyl-2-norbornene, 5-triphenoxysilyl-2-norbornene, 5-diphenoxymethylsilyl-2-norbornene, 5-trifluorosilyl-2-norbornene, 5-trichlorosilyl-2-norbornene, 5-tribromosilyl-2-norbornene and the like.

They can be used either alone or as a combination of two or more of them. These substituted norbornenes having polar group are used desirably at a molar ratio of 30% or less, more desirably at a molar ratio ranging from 0.1% to 30%, and most desirably at a molar ratio ranging from 1% to 20%, based on the whole cyclic olefins.

Specific examples of the cyclic olefins in the present invention further include a non-polar cyclic olefin represented by the following formula (4), which is desirably copolymerized in addition to the above-mentioned substituted norbornene having a polar group.

(4)

[in formula (4), $B^1$, $B^2$, $B^3$ and $B^4$, which are the same or different, each represents a hydrogen atom, a halogen atom, an alkyl group having 1 to 10 carbon atoms, an haloalkyl group, an aralkyl group, a cycloalkyl group or an aryl group, $B^1$ and $B^2$ may form an alkylidene group, and $B^1$ and $B^3$ may be connected to each other to form an alkylene group, a cycloalkylene group, a cycloalkenylene group, an alkenylene group or arylene group; and r represents an integer of 0 to 3.]

Specific examples thereof include unsubstituted or alkyl-substituted cyclic olefins such as 2-norbornene, 5-methyl-2-norbornene, 5-ethyl-2-norbornene, 5-propyl-2-norbornene, 5-isopropyl-2-norbornene, 5-butyl-2-norbornene, 5-t-butyl-2-norbornene, 5-pentyl-2-norbornene, 5-hexyl-2-norbornene, 5-octyl-2-norbornene, 5-decyl-2-norbornene, 5-dodecyl-2-norbornene, 5,5-dimethyl-2-norbornene, 5,6-dimethyl-2-norbornene, 5-methyl-5-ethyl-2-norbornene, 5-cyclohexyl-2-norbornene, tricyclo[4.3.0.1$^{2,5}$]-3-decene, tetracyclo[4.4.0.1$^{2,5}$.1$^{7,10}$]-3-dodecene, 8-methyltetracyclo-[4.4.0.1$^{2,5}$.1$^{7,10}$]-3-dodecene, 8-ethyltetracyclo-[4.4.0.1$^{2,5}$.1$^{7,10}$]-3-dodecene, tricyclo[4.4.0.1$^{2,5}$]-3-undecene and tricyclo[4.3.0.1$^{2,5}$]-3,7-decadiene(dicyclopentadiene), alkenyl- or cycloalkenyl-substituted norbornenes such as 5-vinyl-2-norbornene, 5-allyl-2-norbornene and 5-cyclohexenyl-2-norbornene, aryl- or aralkyl-substituted norbornenes such as 5-phenyl-2-norbornene, 5-methyl-5-phenyl-2-norbornene, 5-benzylnorbornene, 5-naphthyl-2-norbornene, 5-biphenyl-2-norbornene, 1,4-methano-1,4-dihydronaphthalene (benzonorbornene) and 1,4-methano-1,4,4a,9a-tetrahydrofluorene, and alkylidene-substituted cyclic olefins such as 5-methylidene-2-norbornene, 5-ethylidene-2-norbornene and 5-isopropylidene-2-norbornene. They may be used as a combination of two or more of them. In particular, it is preferred that copolymerization is conducted in combination with at least one unsubstituted cyclic olefin selected from 2-norbornene, tricyclo[4.3.0.1$^{2,5}$]-3-decene and tetracyclo[4.4.0.1$^{2,5}$.1$^{7,10}$]-3-dodecene. A combination with 2-norbornene is most desirable among them. These nonpolar cyclic olefins are used desirably at a molar ratio ranging from 70% to 100%, more desirably at a molar ratio ranging from 70% to 99.9%, and most desirably at a molar ratio ranging from 80% to 99%, based on the whole cyclic olefins.

For example, by optionally containing a structural unit of the norbornene substituted with 3 to 10 carbon atoms alkyl group, the solubility of the resulting polymer in a solvent and the glass transition can be controlled to improve processability, and the flexibility can be imparted to the resulting formed article. Further, by containing a structural unit of the cyclic olefin having a functional group such as an alkenyl group, an alkylidene group, an ester group or an alkoxysilyl group, crosslinking sites allowing the cyclic olefinic addition polymer to have a three-dimensional network structure, and functions such as adhesive properties to other materials and good dispersibility can also be imparted. Furthermore, one containing a structural unit of the norbornene having an alkoxysilyl group at an appropriate content can be suitably used in a composite with a metal oxide such as silica, alumina or titania.

The cyclic olefinic addition polymer obtained by the present invention may further optionally contain norbornadiene or at least one monocyclic monoolefin as a structural unit.

As the polymerization solvent, a hydrocarbon solvent can be suitably used. For example, there is used a solvent selected from alicyclic hydrocarbon solvents such as cyclohexane, cyclopentane and methylcyclopentane, aliphatic hydrocarbon solvents such as pentane, hexane, heptane and octane, aromatic hydrocarbon solvents such as toluene, benzene and xylene, and the like. They can be used either alone or as a combination of two or more of them. The weight ratio of solvent/monomer is within the range of 1 to 20.

As for the addition polymerization method, the solvent, the monomer composed of the cyclic olefin, the above-mentioned molecular weight modifier and the above-mentioned polymerization catalyst are added to a reaction vessel in an atmosphere of nitrogen or argon, and polymerization is conducted at a temperature ranging from $-20°$ C. to $100°$ C. These polymerization operations can be conducted either in a batch or a continuous process.

As for the molecular weight of the cyclic olefinic addition polymer of the present invention, the weight average molecular weight in terms of polystyrene measured by gel permeation chromatography using o-dichlorobenzene as a solvent is from 10,000 to 1,500,000, and preferably from 50,000 to 1,000,000. When the weight average molecular weight is less than 10,000, the breaking strength is insufficient at the time when the polymer is formed to a film, a laminar or a sheet, or the solvent resistance and the liquid crystal resistance become poor. On the other hand, when the weight average molecular weight exceeds 1,500,000, the forming processability of the sheet and the film is deteriorated, or the solution viscosity increases in forming a cast film, resulting in difficulty of handling.

The control of the molecular weight of the cyclic olefinic addition polymer is conducted by controlling the amount of the aromatic vinyl compound and/or cyclic nonconjugated diene of the present invention. Further, the simultaneous use of the molecular weight modifier such as an α-olefin or hydrogen, the control of the amount of the polymerization catalyst, the control of the polymerization temperature and the control of the conversion rate to the polymer may be conducted at the same time.

Although there is no particular limitation on the method for adding the aromatic vinyl compound and/or cyclic nonconjugated diene to the polymerization system, they may be added to the polymerization system previously or together with the solvent and the monomer, or with the polymerization catalyst. This is different from a technique of previously mixing a cyclic nonconjugated diene with a transition metal compound and a polymerization promoter component, and synthesizing a catalytic active species, as described in Published Japanese Translation of PCT Application (Hei) 9-508649 described above, although not excluding previous contact with the polymerization catalyst.

The polymerization catalyst components may be each independently introduced into a reaction vessel in which addition polymerization is conducted, or two or more of the components may be previously mixed.

The polymerization is stopped with a compound selected from water, an alcohol, an organic acid, carbon dioxide gas and the like. A polymerization catalyst residue may be separated and removed from an addition polymerization reaction mixture, and known methods may be suitably used. Examples thereof include a method of adding an inorganic acid such as hydrochloric acid, nitric acid or sulfuric acid, or an organic acid such as maleic acid or fumaric acid to the addition polymerization reaction mixture, and washing it with a solution such as water or an alcohol.

The cyclic olefinic addition polymer is obtained, for example, by pouring the addition polymerization reaction mixture in an alcohol such as methanol, ethanol or isopropanol, to coagulate polymer, followed by drying under reduced pressure. The residual unreacted monomer is also removed by this procedure.

When the cyclic olefinic addition polymer produced by the method of the present invention is used as a composite with a metal oxide such as silica, alumina or titania, there is employed a method such as mixing in the solid state with an kneader, mixing a cyclic olefinic addition polymer solution with a solvent dispersion of the metal oxide, and removing the solvent, or a "sol-gel" method of conducting hydrolysis and polycondensation before or after mixing of a solution of the cyclic olefinic addition polymer with a tetraalkoxide of silicon, aluminum, titanium, zirconium or the like and/or a metal trialkoxide selected from an alkyltrialkoxide and an aryltrialkoxide, or a solution thereof. The ratio of the metal oxide used in the complex is from 5 to 70% by weight. The particle size of the metal oxide is not primarily defined. However, when the particle size of the metal oxide in the cyclic olefinic addition polymer is less than 100 nm, the composite becomes transparent. The transparency of the complex decreases with an increase in the ratio of the metal oxide having a particle size of 100 nm or more in the cyclic olefinic addition polymer.

Further, a crosslinking agent containing a peroxide, sulfur, a disulfide, a polysulfide compound, a dioxime compound, a tetrasulfide, a silane coupling agent or the like can be added to the cyclic olefinic addition polymer produced by the method of the present invention, in an amount of 0.05 to 5 parts by weight based on 100 parts by weight of the cyclic olefinic addition polymer, and the polymer can also be converted to a crosslinked article by heat or the like, or directly by light or an electron beam.

The cyclic olefinic addition polymer produced by the method of the present invention can also be molded to an article by a method such as injection molding, blow molding, press molding or extrusion molding. Further, the cyclic olefinic addition polymer can be dissolved in a solvent selected from polar solvents such as a hydrocarbon solvent, a halogenated hydrocarbon solvent, a ketone, an ether, an ester, an amine, an amide and urea, and formed to a laminar, a film or a sheet through casting and a evaporation procedure. Furthermore, the cyclic olefinic addition polymer can also be allowed to swell by the solvent, followed by forming and processing to a film or a sheet while evaporating the solvent through an extruder.

Further, the cyclic olefinic addition polymer produced by the method of the present invention can also be used as a thermoplastic polymer composition in which the addition polymer is mixed with another thermoplastic resin, for example, a ring-opening (co) polymer and/or the hydrogenated ring-opening (co)polymer, an addition polymer of a cyclic olefin with ethylene and/or an α-olefin, polymethyl methacrylate, a polyarylate, a polyethersulfone, polyallylene sulfide, polyethylene, polypropylene, a polyester, a polyamide, a petroleum resin or the like.

To the cyclic olefinic addition polymer produced by the method of the present invention, a phenolic or hydroquinone-based antioxidant such as 2,6-di-t-butyl-4-methylphenol, 4,4'-thiobis(6-t-butyl-3-methylphenol), 1,1'-bis(4-hydroxyphenyl)cyclohexane, 2,2'-methylenebis(4-ethyl-6-t-butylphenol), 2,5-di-t-butylhydroquinone or pentaerythrityl-tetrakis[3-(3,5-di-t-butyl-4-hydroxyphenyl)propionate], and further, a phosphorous-based antioxidant such as tris(4-methoxy-3,5-diphenyl)phosphite or tris(nonylphenyl)phosphite can be added to improve stability against oxidation.

The present invention is illustrated below in more details with reference to examples, but it is to be understood that the invention is not limited thereby.

The composition ratio (mol %) of the monomer in the cyclic olefinic addition polymer was determined, suitably using the $^1$H-NMR method, the $^{13}$C-NMR method and the FT-IR method.

The weight average molecular weight in terms of polystyrene (Mw) and the number average molecular weight in terms of polystyrene (Mn) were measured in o-dichlorobenzene with a Waters 150 CV gel permeation chromatograph manufactured by Waters Co., U.S.A.

REFERENCE EXAMPLE 1

Preparation of Catalyst Component A

In a vessel made of polytetrafluoroethylene (Teflon manufactured by Du Pont, U.S.A., hereinafter the same), which was thoroughly dried and replaced with nitrogen, 10 mmol of nickel 2-ethylhexanoate dissolved in 8.2 ml of a mixed solvent of cyclohexane and n-heptane (mixing ratio: 9:1) was put, and cooled on an ice bath. Then, 3.0 g (12.7 mmol) of hexafluoroantimonic acid was added dropwise while stirring with a magnet type stirring rod made of polytetrafluoroethylene, and the temperature was gradually elevated to room temperature. Toluene was added until the total volume reached 20 ml, and an insoluble component was separated by filtration through a glass filter to obtain a solution of catalyst component A. The nickel atom concentration and the antimony atom concentration in the solution were measured by analysis according to the atomic absorption spectrophotometry, and it was confirmed that both existed in the solution at a ratio of 1:1. Then, the solution was provided to polymerization.

On the other hand, the insoluble component separated by filtration was washed with toluene, dried under vacuum, and dissolved in methanol. Then, analysis according to the atomic absorption spectrophotometry was conducted. As a result, the nickel atom-to-antimony atom ratio was 1:2. This revealed that the insoluble component was a compound in which 2-ethylhexanoic acid anions, counter anions to nickel atoms, were all eliminated, and replaced with $SbF_6^-$.

REFERENCE EXAMPLE 2

Preparation of Catalyst Component B

In a vessel made of polytetrafluoroethylene, which was thoroughly dried and replaced with nitrogen, 10 mmol of nickel 2-ethylhexanoate dissolved in 8.2 ml of a mixed solvent of cyclohexane and n-heptane (mixing ratio: 9:1) was put, and cooled on an ice bath. Then, 1.8 g of a diethyl ether solution of tetrafluoroboric acid (54% by weight) was added dropwise while stirring with a magnet type stirring rod made of polytetrafluoroethylene, and the temperature was gradually elevated to room temperature. After 10 ml of toluene was added, the solvent was removed under vacuum, and the residue was dissolved in toluene again to bring the volume to 20 ml. An insoluble component was separated by filtration through a glass filter, and the nickel atom concentration in the solution was measured by analysis according to the atomic absorption spectrophotometry. Then, the solution was provided to polymerization.

EXAMPLE 1

A 1-liter stainless steal reaction vessel thoroughly dried and replaced with nitrogen was charged with 170 ml (0.85 mol) of a dry toluene solution of 2-norbornene (concentration: 5.0 mol/liter), 38.5 g (0.15 mol) of 5-triethoxysilyl2-norbornene and 400 ml of dry toluene, and 9 mmol of styrene dissolved in 10 ml of toluene was further added. The temperature of the system was adjusted to 20° C. with stirring. Then, 1.6 ml of a dry toluene solution of methyl aluminoxane (manufactured by Tosoh-Akzo) (concentration: 1.57 mol/liter by the aluminum atom) and 1.25 ml of a dry toluene solution of a boron trifluoride-diethyl ether complex (concentration: 1.0 mol/liter) were added, and catalyst component A prepared in Reference Example 1 was further added in an amount of 0.25 mmol in terms of the nickel atom, followed by polymerization for 100 minutes. After dilution with 0.5 liter of toluene, a solution of 2 g of lactic acid dissolved in 20 ml of isopropyl alcohol was added, and the resulting solution was washed twice with about 0.5 liter of purified water. Subsequently, coagulation was conducted in about 4 liters of isopropyl alcohol, and a coagulated product was dried at 90° C. for 40 hours under vacuum to obtain 103 g (87%) of a cyclic olefinic addition polymer. The weight average molecular weight (Mw) was 365,000, the number average molecular weight (Mn) was 120,000, and Mw/Mn was 3.0. As a result of analysis by $^1$H-NMR, the content of the structural unit derived from norbornene was 86 mol %, and the content of the structural unit derived from 5-triethoxysilyl-2-norbornene was 14 mol %.

EXAMPLE 2

The same operations as with Example 1 were conducted with the exception that the amount of the methyl aluminoxane solution to be added was changed to 3.2 ml, and the amount of styrene was changed to 7 mmol, thereby obtaining 107 g (90%) of a cyclic olefinic addition polymer. The weight average molecular weight (Mw) was 308,000, the number average molecular weight (Mn) was 120,000, and Mw/Mn was 2.6, resulting in narrower molecular weight distribution compared to Example 1. As a result of analysis by $^1$H-NMR, the content of the structural unit derived from norbornene was 85 mol %, and the content of the structural unit derived from 5-triethoxysilyl-2-norbornene was 15 mol %.

EXAMPLE 3

The same operations as with Example 1 were conducted with the exception that the amount of the methyl aluminoxane solution to be added was changed to 6.4 ml, and the amount of styrene was changed to 5 mmol, thereby obtaining 104 g (88%) of a cyclic olefinic addition polymer. The weight average molecular weight (Mw) was 234,000, the number average molecular weight (Mn) was 109,000, and Mw/Mn was 2.1, resulting in further narrower molecular weight distribution compared to Examples 1 and 2. As a result of analysis by $^1$H-NMR, the content of the structural unit derived from norbornene was 85 mol %, and the content of the structural unit derived from 5-triethoxysilyl-2-norbornene was 15 mol %.

EXAMPLE 4

The same operations as with Example 1 were conducted with the exception that modified methyl aluminoxane (manufactured by Tosoh-Akzo, hereinafter referred to as "MMAO-1") was added in an amount of 2.5 mmol by the aluminum atom, thereby obtaining 97 g (82%) of a cyclic olefinic addition polymer. The weight average molecular weight (Mw) was 341,000, the number average molecular weight (Mn) was 124,000, and Mw/Mn was 2.8. As a result of analysis by $^1$H-NMR, the content of the structural unit derived from norbornene was 86 mol %, and the content of the structural unit derived from 5-triethoxysilyl-2-norbornene was 14 mol %.

EXAMPLE 5

In a glass flask thoroughly dried and replaced with nitrogen, a toluene solution of methyl aluminoxane and a toluene solution of triethylaluminum were mixed so as to give a ratio of 75/25 in terms of the aluminum atom, and stirred for 2 hours while keeping the mixture at 50° C. to conduct modification. One hundred one grams (85%) of an addition polymer was obtained by the same operations as with Example 1 with the exception that this modified aluminoxane (hereinafter referred to as "MMAO-2") was used in place of methyl aluminoxane. The weight average molecular weight (Mw) was 249,000, the number average molecular weight (Mn) was 105,000, and Mw/Mn was 2.4. As a result of analysis by $^1$H-NMR, the content of the structural unit derived from norbornene was 85 mol %, and the content of the structural unit derived from 5-triethoxysilyl-2-norbornene was 15 mol %.

COMPARATIVE EXAMPLE 1

The same operations as with Example 1 were conducted with the exception that nickel 2-ethylhexanoate (catalyst component C) was added in an amount of 0.25 mmol by the nickel atom in place of catalyst component A were conducted. As a result, 8.2 g (6.9%) of an addition polymer was obtained. The yield was extremely low, compared to Examples 1 and 2. The weight average molecular weight (Mw) was 199,000, the number average molecular weight (Mn) was 91,000, and Mw/Mn was 2.2. As a result of analysis by $^1$H-NMR, the content of the structural unit derived from norbornene was 86 mol %, and the content of the structural unit derived from 5-triethoxysilyl-2-norbornene was 14 mol %.

COMPARATIVE EXAMPLES 2 AND 3

The same operations as with Example 1 were conducted with the exception that nickel bisacetylacetonate (catalyst component D) was added in an amount of 0.25 mmol in place of catalyst component A, and the boron trifluoride-diethyl ether complex was not added. The amount of methyl aluminoxane was changed as shown in Table 1. However, no addition polymer was obtained in any case.

TABLE 1

| | Catalyst Component | Al | Al/Ni mol/mol | BF$_3$/Ni mol/mol | Yield (%) | Mw/Mn |
|---|---|---|---|---|---|---|
| Example 1 | A | MAO | 10 | 5 | 87 | 3.0 |
| Example 2 | A | MAO | 20 | 5 | 90 | 2.6 |
| Example 3 | A | MAO | 40 | 5 | 88 | 2.1 |
| Example 4 | A | MMAO-1 | 10 | 5 | 82 | 2.8 |
| Example 5 | A | MMAO-2 | 10 | 5 | 85 | 2.4 |
| Comparative Example 1 | C | MAO | 10 | 5 | 6.9 | 2.2 |
| Comparative Example 2 | D | MAO | 10 | 5 | 0 | — |
| Comparative Example 3 | D | MAO | 200 | 0 | 0 | — |

C: Nickel 2-ethylhexanoate
D: Nickel bisacetylacetonate

EXAMPLE 6

A 200-ml glass pressure vessel thoroughly dried and eplaced with nitrogen was charged with 19.8 ml of a dry toluene solution of 2-norbornene (concentration: 4.9 mol/liter), 1.0 ml of a dry toluene solution of 8-methyl-8-methoxycarbonyltetracyclo[4.4.0.1$^{2,5}$.1$^{7,10}$]dodeca-3-ene (hereinafter referred to as "cyclic olefin (I)") (concentration: 3.0 mol/liter) and 50 ml of dry toluene, and 0.25 mmol of a dry toluene solution of 1,5-cyclooctadiene (concentration: 0.1 mol/liter) was further added. The temperature of the system was adjusted to 30° C. with stirring. Then, 0.16 ml of a dry toluene solution of methyl aluminoxane (manufactured by Tosoh-Akzo) (concentration: 1.57 mol/liter by the aluminum atom) and 0.2 ml of a dry toluene solution of a boron trifluoride-diethyl ether complex (concentration: 1.0 mol/liter) were added, and catalyst component A prepared in Reference Example 1 was further added in an amount of 0.025 mmol in terms of the nickel atom to initiate polymerization.

After the reaction was conducted for 100 minutes, the resulting solution was diluted with about 30 ml of toluene, 0.4 g of lactic acid dissolved in 1 ml of isopropyl alcohol was added, and the resulting solution was washed twice with 30 ml of purified water. Subsequently, coagulation was conducted in about 1 liter of isopropyl alcohol, and a coagulated product was dried at 90° C. for 40 hours under vacuum to obtain 7.5 g (76%) of an addition polymer. The weight average molecular weight (Mw) was 824,000, and Mw/Mn was 2.6. In the FT-IR spectrum of the addition polymer, a strong absorption based on stretching vibration of the carbonyl group was observed at 1,732 cm$^{-1}$. The content of the structural unit derived from cyclic olefin (I) in the copolymer was determined to be 1.7 mol % by $^1$H-NMR and FT-IR analysis.

EXAMPLE 7

By the same operations as with Example 6 with the exception that catalyst component B prepared in Reference Example 2 was used in an amount of 0.025 mmol in terms of the nickel atom, in place of catalyst component A, 7.0 g (71%) of an addition polymer was obtained. The weight average molecular weight (Mw) was 769,000, and Mw/Mn was 2.5. The content of the structural unit derived from cyclic olefin (I) in the copolymer was determined to be 1.6 mol % by $^1$H-NMR and FT-IR analysis.

COMPARATIVE EXAMPLES 4 TO 7

The same operations as with Example 6 were conducted using catalyst components shown in Table 2. As a result, in Comparative Example 4 in which the boron trifluoride-diethyl ether complex was not used, the polymerization does not proceed at all. Further, when nickel 2-ethylhexanoate (catalyst component C) was used in place of catalyst component A, no addition polymer was obtained even in a case where methyl aluminoxane was used in an amount of 10 times as much as the nickel atom, in terms of the aluminum atom. When methyl aluminoxane was used in an amount of 100 times as much as the nickel atom, the polymerization proceeded at last. However, only low polymerization activity was indicated. In Comparative Example 7 in which nickel bisacetylacetonate (catalyst component D) was used as the catalyst component, and the boron trifluoride-diethyl ether complex was not used, the polymerization did not proceed at all.

EXAMPLES 8 AND 9

Addition polymers (Table 2) were obtained by the same operations as with Examples 6 and 7 with the exception that an itaconic acid anhydride-cyclopentadiene adduct (hereinafter referred to as "cyclic olefin (II)") was added in an amount of 3 mmol in place of cyclic olefin (I). In the FT-IR spectrum of either addition polymer, a strong absorption based on stretching vibration of the carbonyl group was observed at 1,732 cm$^{-1}$.

COMPARATIVE EXAMPLES 8 TO 11

Using catalyst components shown in Table 2, the same operations as with Example 8 was conducted. As a result, in Comparative Example 8 in which catalyst component A was used, and the boron trifluoride-diethyl ether complex was not used, no absorption based on stretching vibration of the carbonyl group was observed at all in the FT-IR spectrum, although a small amount of an addition polymer was obtained. In the case of Comparative Examples 9 and 10 in which nickel 2-ethylhexanoate (catalyst component C) was used as the catalyst component, and the boron trifluoride-diethyl ether complex was used, the polymerization proceeded with low activity by using methyl aluminoxane in an amount of 100 times as much as the nickel atom, in terms of the aluminum atom. However, no absorption based on stretching vibration of the carbonyl group was observed at all in the FT-IR spectrum of the resulting addition polymer. In Comparative Example 11 in which nickel bisacetylacetonate (catalyst component D) was used in place of catalyst component A, and the boron trifluoride-diethyl ether complex was not used, an addition polymer was obtained only in trace amounts.

TABLE 2

| | Catalyst Component | Al/Ni mol/mol | BF$_3$/Ni mol/mol | Cyclic Olefin | Yield (%) | C=O Mol % (*) |
|---|---|---|---|---|---|---|
| Example 6 | A | 10 | 8 | I | 76 | 1.7 |
| Example 7 | B | 10 | 8 | I | 71 | 1.6 |
| Comparative Example 4 | A | 10 | 0 | I | 0 | 0 |
| Comparative Example 5 | C | 10 | 8 | I | 0 | 0 |
| Comparative Example 6 | C | 100 | 8 | I | 28 | 1.6 |
| Comparative Example 7 | D | 200 | 0 | I | 0 | 0 |
| Example 8 | A | 10 | 8 | II | 71 | 1.1 |
| Example 9 | B | 10 | 8 | II | 69 | 1.1 |
| Comparative Example 8 | A | 10 | 0 | II | 9.3 | 0 |
| Comparative Example 9 | C | 10 | 8 | II | 0 | 0 |
| Comparative Example 10 | C | 100 | 8 | II | 21 | 0 |
| Comparative Example 11 | D | 200 | 0 | II | 0 | 0 |

C: Nickel 2-ethylhexanoate
D: Nickel bisacetylacetonate
(*): Molar content of cyclic olefin (I) or (II)

EXAMPLE 10

A 200-ml glass pressure vessel thoroughly dried and replaced with nitrogen was charged with 19.3 ml of a dry toluene solution of 2-norbornene (concentration: 5.2 mol/liter) and 50 ml of dry toluene, and 0.2 ml (0.2 mmol) of a dry toluene solution of styrene (concentration: 1.0 mol/liter) was further added. The temperature of the system was adjusted to 30° C. with stirring. Then, 0.13 ml (0.2 mmol) of a dry toluene solution of methyl aluminoxane (manufactured by Tosoh-Akzo) (concentration: 1.57 mol/liter by the aluminum atom) and 0.1 mmol of the boron trifluoride-diethyl ether complex dissolved in 0.1 ml of dry toluene were added, and nickel catalyst component A prepared in Reference Example 1 was further added in an amount of 0.02 mmol in terms of the nickel atom. Then, polymerization was initiated. After the reaction was conducted for 60 minutes, the resulting solution was diluted with about 30 ml of toluene, and 0.4 g of lactic acid dissolved in 1 ml of isopropyl alcohol was added to stop the reaction. The resulting solution was washed twice with 30 ml of purified water. Subsequently, coagulation was conducted in about 1 liter of isopropyl alcohol, and a coagulated product was dried at 90° C. for 40 hours under vacuum to obtain 9.0 g (95%) of a norbornene addition polymer. The weight average molecular weight (Mw) was 461,000, the number average molecular weight (Wn) was 146,000, and Mw/Mn was 3.2. In analysis by $^1$H-NMR, an absorption based on styrene was less than the limit of quantitative measurement.

EXAMPLES 11 TO 13

The same operations as with Example 10 were conducted with the exception that the amount of styrene to be added was changed. As apparent from results shown in Table 3, the molecular weight decreased depending on the amount of styrene added.

EXAMPLE 14

The same operations as with Example 10 were conducted with the exception that 4-trimethoxysilylstyrene was added in an amount of 4 mmol in place of styrene, thereby obtaining 6.4 g (68%) of a norbornene addition polymer. The weight average molecular weight (Mw) was 162,000, the number average molecular weight (Wn) was 62,000, and Mw/Mn was 2.6. The structural unit of 4-trimethoxysilylstyrene was determined by $^1$H-NMR. As a result, the content was 0.14 mol %, and it approximately corresponded to the ratio of one 4-trimethoxysilylstyrene group per molecule of the polymer.

EXAMPLE 15

The same operations as with Example 14 were conducted with the exception that 4-trimethoxysilylstyrene was added in an amount of 8 mmol, thereby obtaining 5.5 g (58%) of a norbornene addition polymer. The weight average molecular weight (Mw) was 103,000, the number average molecular weight (Wn) was 43,000, and Mw/Mn was 2.4. The structural unit of 4-trimethoxysilylstyrene was determined by $^1$H-NMR. As a result, the content was 0.19 mol %, and it approximately corresponded to the ratio of one 4-trimethoxysilylstyrene group per molecule of the polymer.

COMPARATIVE EXAMPLE 12

The same operations as with Example 10 were conducted with the exception that styrene was not added, thereby obtaining 9.0 g (95%) of a norbornene addition polymer. The weight average molecular weight (Mw) was 744,000, the number average molecular weight (Wn) was 243,000, and Mw/Mn was 3.1.

COMPARATIVE EXAMPLE 13

A 200-ml glass pressure vessel thoroughly dried and replaced with nitrogen was charged with 19.3 ml of a dry toluene solution of 2-norbornene (concentration: 5.2 mol/liter) and 50 ml of dry toluene, and 2 mmol of 4-trimethoxysilylstyrene and 2.55 ml (4.0 mmol) of a dry toluene solution of methyl aluminoxane (manufactured by Tosoh-Akzo) (concentration: 1.57 mol/liter by the aluminum atom) were further added. The temperature of the system was adjusted to 30° C. with stirring. Further, 0.4 ml (0.02 mmol) of a dry toluene solution of nickel bisacetylacetonate (catalyst component D) (concentration: 0.05 mol/liter) was added to initiate polymerization. Thereafter, the same operation as with Example 10 was conducted, and the only trace amounts of polymer was obtained.

EXAMPLE 16

The norbornene addition polymers obtained in Examples 10 to 15 and Comparative Examples 12 and 13 were cast from cyclohexane solutions, and dried at 200° C. for 3 hours under vacuum to prepare films having a film thickness of 0.20 mm. The absorbance peak height at 700 m$^{-1}$ was measured by Fourier transform infrared absorption spectroscopic analysis. As a result, for the polymers obtained in Examples 10 to 13, the absorbance peak increased depending on the amount of styrene added, as observed in results shown in Table 3. For the film of the addition polymer of Comparative Example 12 in which styrene was not added, no absorbance peak was observed at all. Further, for the polymers of Examples 14 and 15 in which 4-trimethoxysilylstyrene was used as the molecular weight modifier, an absorption clearly separated was not observed in Fourier transform infrared absorption spectroscopic analysis.

TABLE 3

|  | Catalyst Component | Molecular Weight Modifier | Amount Added (mol %) (*1) | Yield (%) | Mw ×10³ | Absorbance (*2) | ST-Si Content (*3) |
| --- | --- | --- | --- | --- | --- | --- | --- |
| Example |  |  |  |  |  |  |  |
| 10 | A | Styrene | 0.2 | 95 | 461 | Trace | — |
| 11 | A | Styrene | 1 | 92 | 277 | 0.028 | — |
| 12 | A | Styrene | 2 | 84 | 212 | 0.048 | — |
| 13 | A | Styrene | 5 | 72 | 168 | 0.079 | — |
| 14 | A | 4-Trimethoxysilyl-styrene | 4 | 68 | 162 | (*4) | 0.14 |
| 15 | A | 4-Trimethoxysilyl-styrene | 8 | 58 | 103 | (*4) | 0.19 |
| Comparative Example |  |  |  |  |  |  |  |
| 12 | A | None | — | 95 | 744 | 0 | 0 |
| 13 | D | 4-Trimethoxysilyl-styrene | 2 | Trace | — | — | — |

(*1) Ratio to the whole cyclic olefin monomers
(*2) The absorbance peak height at 700 m$^{-1}$ in infrared spectroscopic analysis
(*3) The molar content of 4-trimethoxysilylstyrene measured by NMR
(*4) An independent absorption was not observed.

EXAMPLE 17

A 200-ml glass reaction vessel thoroughly dried and replaced with nitrogen was charged with 16.8 ml of a dry toluene solution of 2-norbornene (concentration: 4.8 mol/liter), 4.1 ml of 5-hexyl-2-norbornene and 50 ml of dry toluene, and 0.1 ml (0.05 mmol) of a dry toluene solution of 1,5-cyclooctadiene (concentration: 0.5 mol/liter) was further added. The temperature of the system was adjusted to 10° C. Subsequently, 0.26 ml (0.4 mmol) of a dry toluene solution of methyl aluminoxane (manufactured by Tosoh-Akzo) (concentration: 1.57 mol/liter by the aluminum atom) and 0.36 mmol of the boron trifluoride-diethyl ether complex dissolved in 0.72 ml of dry toluene were added in this order. Further, 0.04 mmol of the nickel catalyst prepared in Reference Example 1 was added, to initiate polymerization. After the reaction was conducted for 60 minutes, 3 ml of isopropyl alcohol was added to stop the reaction. The resulting solution was diluted with about 100 ml of toluene, and 1 g of lactic acid dissolved in about 100 ml of a mixture of isopropyl alcohol and purified water was added to wash it. Then, after the resulting solution was washed with 100 ml of purified water, coagulation was conducted in about 1 liter of isopropyl alcohol, and a coagulated product was dried at 90° C. for 40 hours under vacuum to obtain 10.6 g (95%) of a cyclic olefinic addition polymer. The norbornene content of this cyclic olefinic addition polymer was 81 mol %, the weight average molecular weight (Mw) was 322,000, the number average molecular weight (Wn) was 151,000, and Mw/Mn was 2.1 (Table 4).

EXAMPLES 18 AND 19

The same operations as with Example 17 were conducted, changing the amount of 1,5-cyclooctadiene. For both the cyclic olefinic addition polymers, the norbornene content was 80 mol %. As apparent from analysis results shown in Table 4, the molecular weight distribution was narrow, and the molecular weight decreased depending on the amount of 1,5-cyclooctadiene.

COMPARATIVE EXAMPLE 14

The same operations as with Example 17 were conducted with the exception that 1,5-cyclooctadiene was not added. From results shown in Table 4, a cyclic olefinic addition polymer obviously wider in molecular weight distribution than Examples 17 to 19 was obtained. Further, polymerization activity was low, compared to Examples 17 and 18.

COMPARATIVE EXAMPLE 15

The same operations as with Example 17 were conducted with the exception that 1-hexene was added in an amount of 0.2 mmol in place of 1,5-cyclooctadiene. As apparent from results shown in Table 4, a cyclic olefinic addition polymer wider in molecular weight distribution than Examples 17 to 19 was obtained. Further, polymerization activity was similar to that of Comparative Example 14, and the effect of improving activity was not observed.

TABLE 4

| | COD/Ni (molar ratio) | 1-Hexene/Ni (molar ratio) | Yield (%) | Mw ×10³ | Mw/Mn |
|---|---|---|---|---|---|
| Example 17 | 1.2 | — | 95 | 322 | 2.1 |
| Example 18 | 5.0 | — | 88 | 240 | 2.1 |
| Example 19 | 15 | — | 83 | 173 | 1.9 |
| Comparative Example 14 | — | — | 85 | 482 | 3.1 |
| Comparative Example 15 | — | 5.0 | 83 | 375 | 3.0 |

COD: 1,5-Cyclooctadiene

EXAMPLE 20

A 2-liter stainless steal autoclave thoroughly dried and replaced with nitrogen was charged with 190 ml of a dry toluene solution of 2-norbornene (concentration: 5.0 mol/liter), 13.1 ml of 5-triethoxysilyl-2-norbornene and 50 ml of dry toluene, and a solution of 0.032 ml of 1,5-cyclooctadiene diluted with 5 ml of dry toluene was further added. The temperature of the system was adjusted to 10° C. Subsequently, 1.3 ml (2.0 mmol) of a dry toluene solution of methyl aluminoxane (manufactured by Tosoh-Akzo) (concentration: 1.57 mol/liter by the aluminum atom) and 1.8 mmol of the boron trifluoride-diethyl ether complex dissolved in 3.6 ml of dry toluene were added in this order. Further, 0.2 mmol of the nickel catalyst prepared in Reference Example 1 was added to initiate polymerization. After the reaction was conducted for 60 minutes, 10 ml of isopropyl alcohol was added to stop the reaction. Lactic acid was added in an amount of 2 g. The resulting solution was diluted with about 500 ml of toluene, and washed twice with about 600 ml of purified water. Coagulation was conducted in about 5 liters of isopropyl alcohol, and a coagulated product was dried at 90° C. for 40 hours under vacuum to obtain 95.5 g (93%) of a cyclic olefinic addition polymer. The 2-norbornene content of this addition polymer was 95 mol %, the weight average molecular weight (Mw) was 557,000, the number average molecular weight (Wn) was 252,000, and Mw/Mn was 2.2 (Table 5).

EXAMPLE 21

The same operations as with Example 20 were conducted with the exception that the amount of 1,5-cyclooctadiene to be added was changed to 0.12 ml, thereby obtaining 92.6 g (90%) of a cyclic olefinic addition polymer.

Synthesis results are shown in Table 5.

COMPARATIVE EXAMPLE 16

The same operations as with Example 21 were conducted with the exception that 1,5-cyclooctadiene was not added, thereby obtaining 87.3 g (85%) of a cyclic olefinic addition polymer.

As apparent from Table 5 showing the results described above, the cyclic olefinic addition polymers obtained in Examples 20 and 21 were narrow in molecular weight distribution, compared to one obtained in Comparative Example 16 in which 1,5-cyclooctadiene was not added, and the molecular weight was controlled depending on the amount of 1,5-cyclooctadiene added. Further, polymerization activity was improved.

TABLE 5

| | COD/Ni (molar ratio) | Yield (%) | Mw ×10³ | Mw/Mn |
|---|---|---|---|---|
| Example 20 | 1.3 | 93 | 557 | 2.2 |
| Example 21 | 4.9 | 90 | 395 | 2.1 |
| Comparative Example 16 | — | 85 | 796 | 3.2 |

COD: 1,5-Cyclooctadiene

INDUSTRIAL APPLICABILITY

According to the method for producing the cyclic olefinic addition polymer of the present invention, the addition polymer of the cyclic olefin having a polar group can be obtained using the easily available catalyst component, and without using a large amount of the aluminoxane. Further, the cyclic olefinic addition polymer controlled in molecular weight and having the aromatic substituent group introduced into the molecular chain terminal is obtained. Still further, the cyclic olefinic addition polymer controlled in molecular weight, containing the norbornene having a polar group as the structural unit, and further having the aromatic substituent group at the molecular chain terminal is obtained. Yet still further, the cyclic olefinic addition polymer controlled in molecular weight and having the aromatic substituent group at the molecular chain terminal is obtained. In addition, improvement in polymerization activity of the cyclic olefin can be obtained.

The cyclic olefinic addition polymer produced by the method of the present invention has excellent heat resistance, optical characteristics, solvent resistance, chemical resistance, liquid crystal resistance and uniformity, so that it is suitably used for optical materials such as optical disks, optical fiber, lenses, prisms, optical filters, optical waveguides and light guides, materials for electronic parts such as semiconductor sealants, medical instruments, various containers, coating agents, adhesives, binders and the like, including liquid crystal display device substrates, electrochromic display device substrates, various window materials, optical films such as polarization films, retardation films, liquid crystal films and antireflection films, OHP films, base materials for print substrates and the like.

What is claimed is:

1. A method for producing a cyclic olefinic addition polymer, comprising polymerizing a cyclic olefin containing at least one substituted norbornene represented by the following formula (2) by addition polymerization in a hydrocarbon solvent, using a polymerization catalyst component containing (i) a transition metal compound represented by the following formula (1), (ii) a Lewis acid compound and (iii) an alkyl aluminoxane:

$$(L_1MX)(An) \qquad (1)$$

(in formula (1), M is a groups 8 to 10 transition metal in the periodic table, L is a neutral ligand or a solvent molecule, 1 is from 0 to 3, X is a β-diketonate anion or a carboxylic acid anion having a linear or branched alkyl group having 1 to 12 carbon atoms, and An is a non-coordinating or weakly coordinating anion)

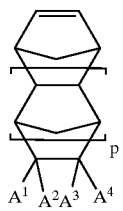

(2)

(in formula (2), at least one of $A^1$, $A^2$, $A^3$ and $A^4$ is a polar group represented by —$(CR^1R^2)_qZ$, and the others, which are the same or different, each represents a hydrogen atom, a halogen atom, an alkyl group having 1 to 10 carbon atoms, a haloalkyl group, an aralkyl group, a cycloalkcyl group or an aryl group, wherein Z represents —C(O)$R^3$, —OC(O)$R^4$, —C(O)O$R^5$ or —Si$Y^1Y^2Y^3$, $R^1$ to $R^5$, which are the same or different, each represents a hydrogen atom, a hydrocarbon group having 1 to 10 carbon atoms or a halogenated hydrocarbon group; $Y^1$ to $Y^3$ are the same or different, at least one is a halogen atom, an alkoxyl group, an allyloxy group or a siloxy group, and the others each represents a hydrogen atom, a hydrocarbon group having 1 to 10 carbon atoms or a halogenated hydrocarbon group; $A^1$ and $A^2$, or $A^1$ and $A^3$ may be cyclized to form a lactone or an acid anhydride; and p and q each represent an integer of 0 to 3).

2. A method for producing a cyclic olefinic addition polymer, which comprises further adding at least one aromatic vinyl compound and/or at least one cyclic nonconjugated polyene compound, as a molecular weight modifier in conducting addition polymerization of a cyclic olefin in a hydrocarbon solvent, using a polymerization catalyst component containing (i) a transition metal compound represented by the following formula (1), (ii) a Lewis acid compound and (iii) an alkyl aluminoxane:

$$(L_1MX)(An) \qquad (1)$$

wherein M is a groups 8 to 10 transition metal in the periodic table, L is a neutral ligand or a solvent molecule, 1 is from 0 to 3, X is a β-diketonate anion or a carboxylic acid anion having a linear or branched alkyl group having 1 to 12 carbon atoms, and An is a non-coordinating or weakly coordinating anion.

3. The method for producing a cyclic olefinic addition polymer of claim 2, in which the cyclic olefin comprises at least one substituted norbornene represented by the following formula (2):

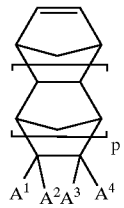

(2)

wherein at least one of $A^1$, $A^2$, $A^3$ and $A^4$ is a polar group represented by —$(CR^1R^2)_qZ$, and the others, which are the same or different, each represents a hydrogen atom, a halogen atom, an alkyl group having 1 to 10 carbon atoms, a haloalkyl group, an aralkyl group, a cycloalkyl group or an aryl group, wherein Z represents —C(O)$R^3$, —OC(O)$R^4$, —C(O)O$R^5$ or —Si$Y^1Y^2Y^3$, $R^1$ to $R^5$, which are the same or different, each represents a hydrogen atom, a hydrocarbon group having 1 to 10 carbon atoms or a halogenated hydrocarbon group; $Y^1$ to $Y^3$ are the same or different, at least one is a halogen atom, an alkoxyl group, an allyloxy group or a siloxy group, and the others each represents a hydrogen atom, a hydrocarbon group having 1 to 10 carbon atoms or a halogenated hydrocarbon group; $A^1$ and $A^2$, or $A^1$ and $A^3$ may be cyclized to form a lactone or an acid anhydride; and p and q each represent an integer of 0 to 3.

4. The method for producing a cyclic olefinic addition polymer according to claim 1, in which the cyclic olefin comprises at least one substituted norbornene represented by the following formula (3):

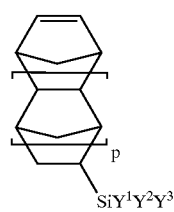

(3)

(in formula (3), $Y^1$ to $Y^3$ are the same or different, at least one is a halogen atom, an alkoxyl group, an allyloxy group or a siloxy group, and the others each represents a hydrogen atom, a hydrocarbon group having 1 to 10 carbon atoms or a halogenated hydrocarbon group; and p represents an integer of 0 to 3).

5. The method for producing a cyclic olefinic addition polymer according to claim 1, in which in addition to the substituted norbornene represented by formula (2), at least one non-polar cyclic olefin represented by the following formula (4) is further copolymerized:

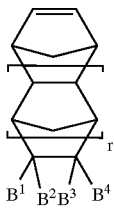

(4)

(in formula (4), $B^1$, $B^2$, $B^3$ and $B^4$, which are the same or different, each represents a hydrogen atom, a halogen atom, an alkyl group having 1 to 10 carbon atoms, a haloalkyl group, an aralkyl group, a cycloalkyl group or an aryl group, $B^1$ and $B^2$ may form an alkylidene group, and $B^1$ and $B^3$ may be joined to each other to form an alkylene group, a cycloalkylene group, a cycloalkenylene group, an alkenylene group or arylene group; and r represents an integer of 0 to 3).

6. The method for producing a cyclic olefinic addition polymer according to claim 2, in which the aromatic vinyl compound is present and is styrene or a substituted styrene.

7. The method for producing a cyclic olefinic addition polymer according to claim 2, in which the cyclic nonconjugated polyene compound is present and is represented by the following formula (5):

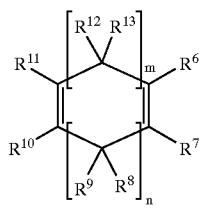

(5)

(in formula (5), $R^6$ to $R^{13}$, which are the same or different, each represents a hydrogen atom, a halogen atom, a hydrocarbon group having 1 to 10 carbon atoms, a halogenated hydrocarbon group, an organo-silicon group or a halogenated silicon group, and m and n are an integer of 1 to 3).

8. The method for producing a cyclic olefinic addition polymer according to claim 2, in which the cyclic nonconjugated polyene compound is present and is cyclooctadiene or a substituted cyclooctadiene.

9. The method for producing a cyclic olefinic addition polymer according to claim 1, in which the non-coordinate or weakly coordinate anion of component (i) is one selected from $SbF_6^-$, $PF_6^-$, $BF_4^-$, $CF_3SO_3^-$ and $CF_3COO^-$, and (ii) the Lewis acid compound is one selected from boron trifluoride, aluminum trifluoride, titanium tetrachloride, antimony pentafluoride, tris(pentafluorophenyl)boron and tris(3,5-bistrifluoromethylphenyl)boron.

10. The method for producing a cyclic olefinic addition polymer according to claim 1, in which (i) the transition metal compound represented by formula (1) is a strong Bronsted acid-modified compound of a compound selected from a β-diketonate compound of a groups 8 to 10 transition metal in the periodic table and a carboxylic acid salt of a groups 8 to 10 transition metal in the periodic table, the carboxylic acid having a linear or branched alkyl group having 1 to 12 carbon atoms.

11. The method for producing a cyclic olefinic addition polymer according to claim 1, in which (i) the transition metal compound is a nickel compound.

12. The method for producing a cyclic olefinic addition polymer according to claim 1, in which (iii) the alkyl aluminoxane is used in an amount ranging from 1 to 50 times as much as a transition metal atom of component (i) in terms of an aluminum atom.

13. The method for producing a cyclic olefinic addition polymer according to claim 1, in which (iii) the alkyl aluminoxane is methyl aluminoxane.

\* \* \* \* \*